(12) United States Patent
Sassen et al.

(10) Patent No.: US 10,581,086 B2
(45) Date of Patent: Mar. 3, 2020

(54) CATHODE FORMULATION FOR SURVIVOR LOCATOR LIGHT

(71) Applicant: Epsilor-Electric Fuel LTD, Beit Shemesh (IL)

(72) Inventors: Jonathan Sassen, Ramat Beit Shemesh (IL); Yuli Zingerman, Beit Shemesh (IL)

(73) Assignee: Epsilor-Electric Fuel, LTD., Beit Shemesh (IL)

( * ) Notice: Subject to any disclaimer, the term of this patent is extended or adjusted under 35 U.S.C. 154(b) by 225 days.

(21) Appl. No.: 15/598,867

(22) Filed: May 18, 2017

(65) Prior Publication Data

US 2018/0337413 A1    Nov. 22, 2018

(51) Int. Cl.

| | | |
|---|---|---|
| *H01M 6/34* | (2006.01) | |
| *H01M 4/46* | (2006.01) | |
| *H01M 4/42* | (2006.01) | |
| *H01M 2/16* | (2006.01) | |
| *H01M 4/48* | (2010.01) | |
| *H01M 4/58* | (2010.01) | |
| *H01M 4/08* | (2006.01) | |
| *H01M 2/36* | (2006.01) | |
| *H01M 4/62* | (2006.01) | |

(Continued)

(52) U.S. Cl.
CPC .............. *H01M 6/34* (2013.01); *H01M 2/12* (2013.01); *H01M 2/1646* (2013.01); *H01M 2/36* (2013.01); *H01M 4/043* (2013.01); *H01M 4/0471* (2013.01); *H01M 4/08* (2013.01); *H01M 4/364* (2013.01); *H01M 4/42* (2013.01); *H01M 4/46* (2013.01); *H01M 4/48* (2013.01); *H01M 4/58* (2013.01); *H01M 4/62* (2013.01); *H01M 4/621* (2013.01); *H01M 4/625* (2013.01); *H01M 6/32* (2013.01); *H01M 4/765* (2013.01)

(58) Field of Classification Search
CPC ............ H01M 6/34; H01M 4/46; H01M 4/48; H01M 4/42; H01M 2/16; H01M 2/1646
See application file for complete search history.

(56) References Cited

U.S. PATENT DOCUMENTS

| | | | |
|---|---|---|---|
| 1,011,485 A  * | 12/1911 | Pfleiderer | ............... H01M 6/32 429/118 |
| 1,400,513 A | 12/1921 | Benner | |
| 2017/0237082 A1* | 8/2017 | Goldstein | ............. H01M 4/622 429/119 |

FOREIGN PATENT DOCUMENTS

| | | |
|---|---|---|
| EP | 0692834 | 1/1996 |
| WO | WO 1995/030248 | 11/1995 |

* cited by examiner

*Primary Examiner* — Karie O'Neill Apicella
(74) *Attorney, Agent, or Firm* — Robert G. Lev

(57) ABSTRACT

A Water Activated Battery characterized by
  a) At least one anode selected from the group consisting of magnesium, aluminum, zinc and alloys thereof;
  b) A cathode comprising at least one basic copper salt comprising $Cu(OH)_2$ combined with a copper salt CuX (with (n−1) the molar ratio between the CuX and the $Cu(OH)_2$ in the basic copper salt), such that a discharge reaction in saline versus a Mg anode could be written $nMg+Cu(OH)_2.(n-1)CuX=Mg(OH)_2+(n-1)MgX+nCu$) on a skeletal frame, the cathode further comprising a non-hygroscopic soluble, ionically conductive material;
  c) at least one cavity separating said cathode and said at least one anode; and (Continued)

d) at least one aperture leading to said at least one cavity for the ingress of an electrolyte-forming, aqueous liquid.

17 Claims, 3 Drawing Sheets

(51) Int. Cl.
*H01M 4/36* (2006.01)
*H01M 6/32* (2006.01)
*H01M 4/04* (2006.01)
*H01M 2/12* (2006.01)
H01M 4/76 (2006.01)

CATHODE FORMULATION FOR SURVIVOR LOCATOR LIGHT

BACKGROUND

Passengers and crew of aircraft and seafaring vessels must be provided with life jackets that have Water Activated Batteries (WABs) powering survivor locator lights. WABs for use on ships typically include lithium based power cells which are generally safe, reliable and economical. However, due to the slight potential for fires and explosions, lithium based power cells are forbidden to be used in WABs for aircraft. Instead, WABs have been developed which contain dry electrodes connected to a lamp, such that immersion in water causes the water to enter apertures in the outer casing of the WAB, fill the gap between the electrodes and dissolve a salt that is included in the cathode of the WAB to provide ions so that an ionic current is created between the electrodes powering the lamp.

According to Aerospace Standard AS4492 for Survivor Location Lights, Water Activated Batteries are required to light the lamp with a specified light intensity within ten minutes of immersion in fresh water and within 5 minutes of immersion in seawater, and to maintain this light intensity for at least eight hours. Such Water Activated Batteries are also required to have a long shelf life. Unfortunately humidity tends to cause the same reactions as those that immersion activates, and some parts of the world, such as Jamaica, Florida and Hong Kong, have hot humid environments. The chemicals used in water activated batteries thus need to meet the conflicting requirements of being stable in hot, humid environments, yet easily activated by immersion in water.

Deferred-action batteries of this type have been known for decades, and various embodiments of such batteries and methods for the production and use thereof, as well as for the manufacture of their component parts, have been described, inter alia, in U.S. Pat. Nos. 2,491,640; 2,636,060; 2,655,551; 2,658,935; 2,716,671; 2,817,697; 3,343,988; 3,859,136; 3,953,238; 4,016,339; 4,192,913; 4,261,853; 4,332,864; 4,368,167; 4,487,821; 4,803,135; and 4,822,698.

U.S. Pat. No. 2,491,640 describes a voltaic cell of this type that is intended especially for use in operating an emergency signal at sea. The signal may be a light to indicate the presence of a person who has become stranded by shipwreck or other causes. It may also be an electronic apparatus floating on the water that emits a signal which can be detected at a distant point. The battery is adapted to power the signal and to be activated by immersion in water, which may be the fresh water of an inland lake or river, or the salt water of the ocean.

Such batteries essentially comprise an anode which is usually a magnesium alloy, and a cathode that has traditionally been a silver or copper halide, wherein discharge of the stored energy is initiated by immersing the battery in seawater, which serves as a conducting electrolyte between the anode and the cathode.

Most of the earliest patents that relate to voltaic cells of this type use cathodes based on cuprous chloride, while more recent patents such as U.S. Pat. No. 4,192,913 and 4,261,853 describe cathodes based on cuprous thiocyanate.

For example, U.S. Pat. No. 5,424,147 to Khasin et al, describes a water-activated, deferred-action battery having a housing containing at least one cell, comprising at least one anode selected from the group consisting of magnesium, aluminum, zinc and alloys thereof; a cathode comprising a skeletal frame including conductive metal and having a portion of its surface area formed as open spaces, and further comprising a heat-pressed, rigid static bed of active cathode material encompassing the skeletal frame, the cathode material being formed of cuprous chloride, sulfur, carbon and a water-ionizable salt and being compacted and fused under pressure and heat to itself and to the skeletal frame, to form a heat-fused, conductive, electrochemically active phase; at least one cavity separating the cathode and the at least one anode, and at least one aperture leading to the at least one cavity for the ingress of an electrolyte-forming, aqueous liquid.

Other cathodes described in the literature include copper sulfate, lead chloride, copper iodide, lead oxide or potassium persulfate as the active material. However, all of the above materials suffer from one or more of the following problems:
- sensitivity to humidity upon storage resulting in expansion of the cathode until the cavity between the anode and cathode no longer exists
- shorting the electrodes and discharging the battery, fast dissolution in water upon activation which results in early failure
- high cost
- use of toxic materials.

Various well-known adaptations have been used to protect cathodes from high humidity. These include the addition of water soluble films that have a low water vapor transmission rate (WVTR). However, such water soluble films only have a low WVTR in low or medium humidity, but in high humidity the films have a high WVTR and so are not effective. In addition after prolonged storage of many years it may take many minutes for them to dissolve.

Another tried solution is to provide mechanical plugs that block the apertures, preventing humid air from reaching the cathode, which are automatically removed by inflating the lifejacket. However, automatic removal of plugs is an expensive and bulky addition to each lifejacket.

While remaining fully compliant with International Aerospace Standards, there is an interest in prolonging the product life of survivor locator lights in high humidity environments, in shortening the period for the light to come on following immersion, and in reducing unit cost.

SUMMARY OF THE INVENTION

A first aspect of the invention is directed to providing a Water Activated Battery comprising:
  a) at least one anode selected from the group consisting of magnesium, aluminum, zinc and alloys thereof;
  b) a cathode comprising a skeletal frame supporting at least one basic copper salt comprising $Cu(OH)_2$ combined with a copper salt $(n-1)CuX$ (with $(n-1)$ being the molar ratio between the CuX and the $Cu(OH)_2$ in the basic copper salt), such that a discharge reaction in saline versus a Mg anode could be written $nMg+Cu(OH)_2.(n-1)CuX=Mg(OH)_2+(n-1)MgX+nCu)$, the cathode further comprising a soluble, non-hygroscopic ionically conductive material;
  c) at least one cavity separating said cathode and said at least one anode; and
  d) at least one aperture leading to said at least one cavity for the ingress of an electrolyte-forming, aqueous liquid.

The soluble non-hygroscopic ionically conductive material may be selected from the group comprising Copper(II) formate hydrate $[Cu(HCO_2)2.H_2O]$, Sodium ferrocyanide decahydrate $[K_4Fe(CN)_6.10H_2O]$, Potassium ferricyanide $[K_4Fe(CN)_6.10H_2O]$ $[K_3Fe(CN)_6]$, Potassium sulfate $[K_2SO_4]$ and Calcium lactate pentahydrate $[[CH_3CH(OH)$ COO]$_2$Ca.5H$_2$O], Sodium Citrate Monobasic [HOC(COONa)(CH$_2$COOH)$_2$], Magnesium Formate Dihydrate [C$_2$H$_2$MgO$_4$.2H$_2$O].

Typically, the basic copper salt is selected from the list comprising basic copper sulfate, basic copper carbonate, basic copper acetate (verdigris) and basic copper chloride.

Optionally, the basic copper salt is compacted and fused to the skeletal frame and to itself, to form a heat-fused, conductive, electrochemically active material.

In some embodiments, a portion of a surface of the cathode is formed as open spaces.

Typically, the cathode further comprises an electronically conductive material.

Typically, said electronically conductive material is selected from the group comprising graphite, carbon black and carbon fibers.

Optionally the ionically conductive material comprises a salt of an alkali, alkali earth element or a transition metal.

Typically, the ionically conductive material comprises a halide or a sulfate.

Typically the cathode further comprises a binder material.

Optionally, the binder material comprises a fluoropolymer, a kaolin, a wax or sulfur.

In some embodiments, the cathode material is fused to itself by heating during or after compression.

Optionally, the water activated, deferred-action battery comprises at least one basic copper salt on a skeletal frame.

Optionally, the anode and cathode are parallel flat plates.

Alternatively, the anode is a hollow cylinder and the cathode is a smaller cylinder nested within the anode without contact between the anode and cathode.

Alternatively, again, the cathode is a hollow cylinder and the anode is a smaller cylinder nested within the cathode without contact between the anode and cathode.

A second aspect is directed to a method of fabricating a cathode for a water-activated, deferred-action battery comprising hot pressing the cathode ingredients together into a mold.

A third aspect is directed to a battery for a survivor locator light comprising a cathode plate sandwiched between a pair of anode plates and separated from the anode plates by an air gap, the cathode and anodes encased in a plastic shell having an air hole at its base and at least one further air hole near its top edge, wherein the anode plates comprise magnesium and the cathode plate comprises a non-hygroscopic basic copper salt and a readily soluble non-hygroscopic salt.

BRIEF DESCRIPTION OF FIGURES

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in, the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a perspective, fragmented view of a preferred embodiment of the battery according to the invention;

FIG. 2 is a perspective, fragmented view of the cathode; and

FIG. 3 is a photograph showing a reference cathode comprising NaCl together with a second cathode comprising a non-hygroscopic but readily soluble ionic salt, both after exposure to a super-saturated condensing humid environment.

DESCRIPTION OF EMBODIMENTS

The present invention relates to water-activated, deferred-action batteries and to a method for producing a cathode for such batteries.

More particularly the present invention relates to a deferred-action battery which is adapted to be activated by immersing it in water. Such batteries may be used for automatically powering emergency lamps and sirens on life-jackets and in case of flooding, for example.

Embodiments of the invention are directed to such survivor locator lights and their batteries.

There are standard humidity tests such as SAE International Aerospace Standard (AS) 4492 Survivor Locator Lights, December 1995 and reaffirmed Nov. 18, 2004, RTCA/DO-160C and RTCA/DO-160E that such batteries and lamps must pass.

There is an interest in prolonging the product life of survivor locator lights in high humidity storage conditions, shortening the period for the light to come on following immersion, and reducing unit costs while being fully compliant with International Aerospace Standards.

Embodiments of the invention are directed to such survivor locator lights and their batteries.

Figure 1:
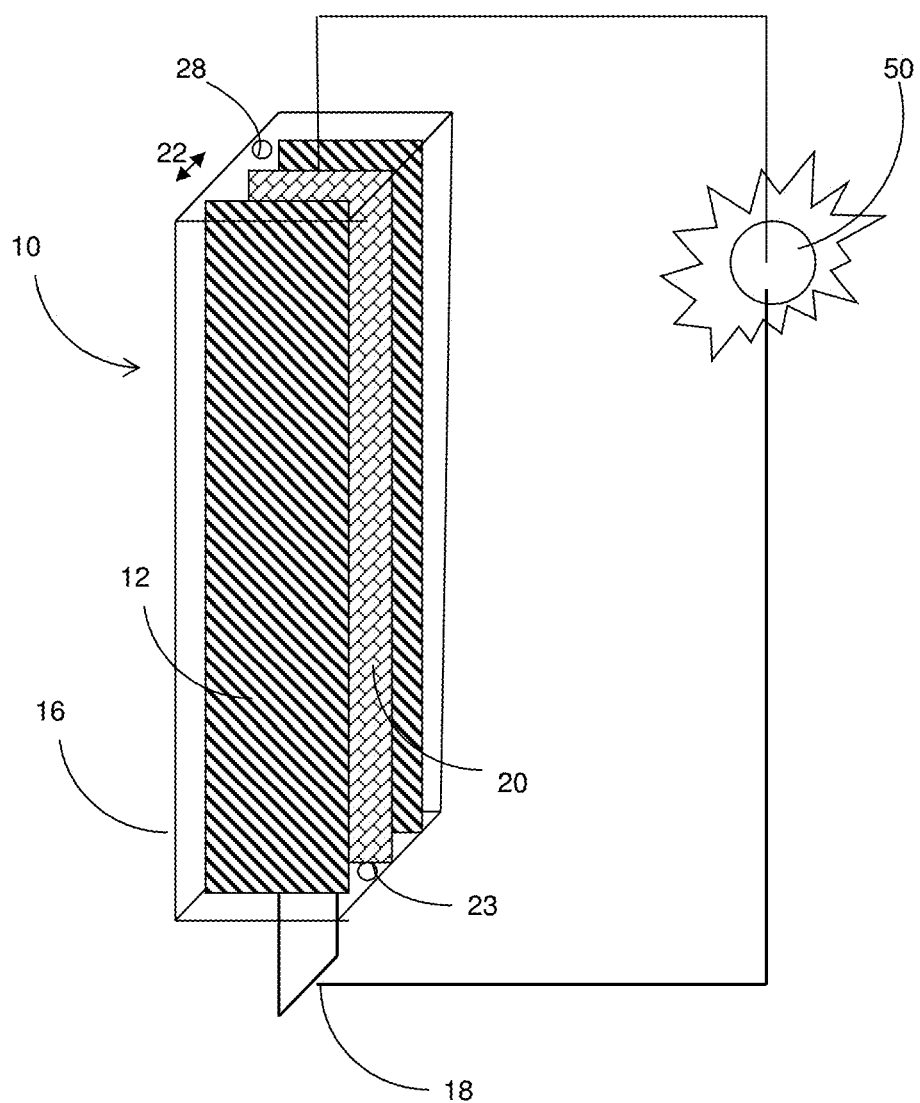

With reference to FIG. 1 a water-activated, deferred-action battery 10 having a single cell is shown. The battery 10 consists of two spaced-apart anodes 12, each having the form of a thin plate. Anodes 12 are made of a metal selected from the group comprising magnesium, aluminum, zinc, and alloys thereof. Particularly preferred is a magnesium alloy.

Each anode 12 is held in parallel, adjacent relationship to a major inner face 14 of a plastic battery housing 16. Both anodes 12 are connected in parallel to a negative terminal 18, accessible from outside housing 16.

A cathode plate 20 that is typically thicker than the anodes 12, but has about the same area as each anode 12, is positioned between the anodes 12. A cavity 22 containing air and, optionally, separator layers (not shown) is included between the cathode plate 20 and each anode 12 to electrically insulate the cathode 20 from the anode 12 while the battery 10 is in its inactivated state. The battery has a housing 16 that is typically plastic. Two apertures 23, 28 are provided in the case 14, a lower aperture 23 near the base of the housing 16, and an upper aperture 28 near the top of the housing 16. Both apertures 23, 28 connect the cavity 22 to the environment outside the housing 16 and ensure that if the battery 10 is immersed in water, the water can penetrate via the apertures 23, 28 into the housing 16, flooding the cavity 22. The aperture 23 at the base of the housing 16 not only serves for the ingress of the electrolyte-forming aqueous liquid, typically water but also allows reaction products such as solid hydroxides and oxides to be emitted from the cavity 22. The second aperture 28 is an outlet near the top of the housing 16 that, on immersion of the battery 10 into water, serves to allow air to escape from the housing 16 so that water can enter the battery 10 to start power-producing operation. When connected to a lifejacket worn by a person, the battery is typically substantially vertical, so that the lower aperture 23 is below the upper aperture 28. The upper aperture 28 allows hydrogen generated in the cell to escape the housing 16. In a preferred embodiment, the higher aperture 28 is located on an opposite surface of the housing 16 from the lower aperture 28. In some embodiments, more than one venting aperture 28 is provided, such as one on each side of the top end of the housing 16.

The battery 10 is usually directly and switchlessly connected to a lamp 50 and is generally attached to a lifejacket (not shown). On immersion into water, the battery 10 is activated and the lamp is illuminated.

The cathode plate 20 may include a basic copper salt such as basic copper sulfate or basic copper carbonate. Water activated batteries that include basic copper salts are disclosed in pending application PCT/IL2017/050026 and corresponding U.S. application Ser. No. 15/041,401 also to Epsilor Electric Fuel. The basic copper salt has a low aqueous solubility, so usefully, unlike the battery described in U.S. Pat. No. 5,424,147 to Khasin et al, the apertures 23, 28 of batteries in accordance with the present battery 10 do not require sealing by a water soluble film or mechanical plugs to protect the battery 10 before use to extend its shelf-life. The absence of this film decreases the activation time, decreases the product complexity, thereby lowering the fabrication costs.

To provide a ready source of ions, the active cathode material 20 has traditionally included a readily soluble salt, which invariably was table salt (NaCl) or calcium sulfate.

Humidity tests with these materials have shown condensation of water droplets on the surface of the electrode. It has been hypothesized that the hygroscopic nature of the readily soluble salt has encouraged condensation of water on the cathode surface and that this is a key contributor to the short shelf life of such batteries in humid conditions, such as those prevalent in Florida, Jamaica, Hong Kong and South China in the monsoon season.

In embodiments of the present invention and in contradistinction to the prior art, in addition to a basic copper salt the active cathode material 20 further includes a non-hygroscopic but readily soluble water-ionizable salt. The readily soluble, water ionizable non-hygroscopic salt is provided to provide ions on immersion into fresh water, such as a lake, for example.

The active cathode material 20 may further include carbon to provide electrons, sulfur, a polymeric binder such as a Fluoropolymer, wax. The carbon may suitably be provided as graphite, carbon fibers or carbon black, where carbon black is preferred.

The discharge reaction against a Mg based anode in water could be:

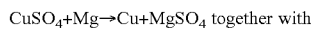
$CuSO_4 + Mg \rightarrow Cu + MgSO_4$ together with

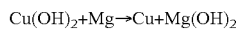
$Cu(OH)_2 + Mg \rightarrow Cu + Mg(OH)_2$

The reason that sulfur may be added is that sulfur present in the cathode converts any copper produced by these discharge reactions to CuS, which increases the energy content of the battery.

There is also some parasitic reaction of Mg with water, giving hydrogen.

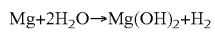
$Mg + 2H_2O \rightarrow Mg(OH)_2 + H_2$

Figure 2:
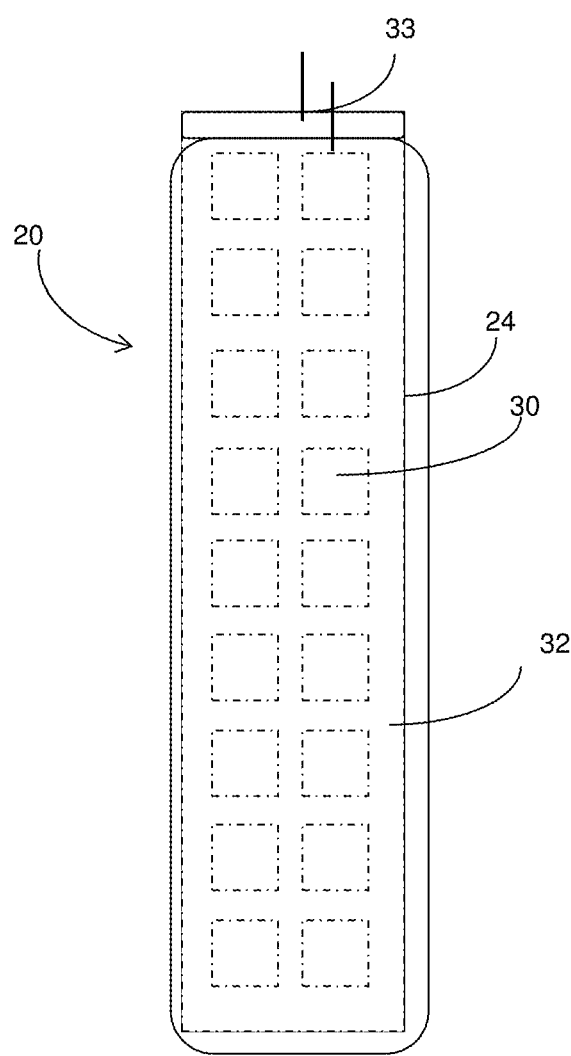

Referring now to FIG. 2, one embodiment of the cathode plate 20 is shown in further detail. The cathode plate 20 comprises a skeletal frame 24 including a conductive metal and having a portion of its surface area formed as open spaces 30. The main bulk of the cathode plate 20 comprises a heat-pressed, rigid, static bed 32 of active cathode material including a basic copper salt such as basic copper sulfate or basic copper carbonate encompassing the skeletal frame 24 together with about 10% by weight of a readily soluble water ionizable non-hygroscopic salt.

Under pressure and heat, the cathode plate 20 is compacted and fused to itself and to the skeletal frame 24, to form a heat-fused, conductive, electrochemically-active phase. As with many sintering operations, the strength of the form thus produced can be improved by the addition of a suitable binder material; advantageously, fluorinated ethylene propylene and/or kaolin may be added to act as a supplementary binder. The skeletal frame 24 is electrically connected to a positive terminal 33 which is accessible from outside the housing 16.

For the battery to be activated by immersion in water, a readily water ionizable salt is required. However, it has been found that water ionizable salts used in the past, such as NaCl, CaSO$_4$ or mixtures thereof, being hygroscopic, absorb moisture from the air which may be very humid in some parts of the world, such as Florida, the Caribbean, Hong Kong, and so on. This may cause the nucleation and growth of water droplets on the surface of the cathode, which, if they bridge the gap to the anode which is typically less than a millimeter away, cause current leakage and adversely affects the shelf-life of the battery.

Embodiments of the invention are directed to a solution to this problem. Instead of NaCl, CaSO$_4$ or mixtures thereof, non-hygroscopic but still readily soluble salts may be used.

The following table lists various non-hygroscopic but still readily soluble ionic salts that were tested.

| Salt | Formula | CAS |
|---|---|---|
| Copper(II) formate hydrate | Cu(HCO$_2$)$_2$•H$_2$O | 133386-04-6 |
| Sodium ferrocyanide decahydrate | K$_4$Fe(CN)$_6$•10H$_2$O | 14434-22-1 |
| Magnesium formate dehydrate | Mg(HCO$_2$)•2H$_2$O | 6150-82-9 |
| Potassium ferricyanide | K$_3$Fe(CN)$_6$ | 13746-66-2 |
| Potassium sulfate | K$_2$SO$_4$ | 7778-80-5 |
| Calcium lactate pentahydrate | [CH$_3$CH(OH)COO]$_2$Ca•5H$_2$O | 5743-47-5 |
| Sodium Citrate Monobasic | HOC(COONa)(CH$_2$COOH)$_2$ | 18996-35-5 |

Basic copper sulfate cathodes 20 were prepared as follows:

CuSO$_4$.3Cu(OH)$_2$.H$_2$O 4 gm (Northern Michigan Aquatics), sulfur 1.2 gm (Aldrich), carbon black 1 gm (Cabot), 1 gm of a non-hygroscopic but readily soluble ionic salt, and FEP powder 0.8 gm (DuPont) were weighed into a Pascal blender and blended for two hours. The 8 g mix was transferred to the cylinder of a piston and cylinder type die, wherein the cylinder had a die recess with an open area of 72.5 mm. First, 4 gm of the mix was poured into the die cylinder and leveled, then the cathode current collector (a pre-tabbed copper expanded metal sheet, approximately 20 mesh, obtained from the Dexmet Corp. or a Titanium strip) was laid over this, and a further 4 g portion of mix added to the die cylinder and leveled.

The standard die was then closed with its mating piston section. The closed die was then heated to 110° C. in a 5 ton press with heated platens (PHI), and the mix pressed for four minutes. After cooling and removing the compact from the die, the cathode was observed to be robust and uniform, with a thickness of 5 mm.

When assembled into the battery 10 and circuit shown in FIG. 1, it was subjected to the high humidity testing conditions defined in the AS4492 standard, and then immersed in water. Within five minutes of immersion, the lamp 50 lit up and continued to provide light for over 10 hours.

Figure 3:
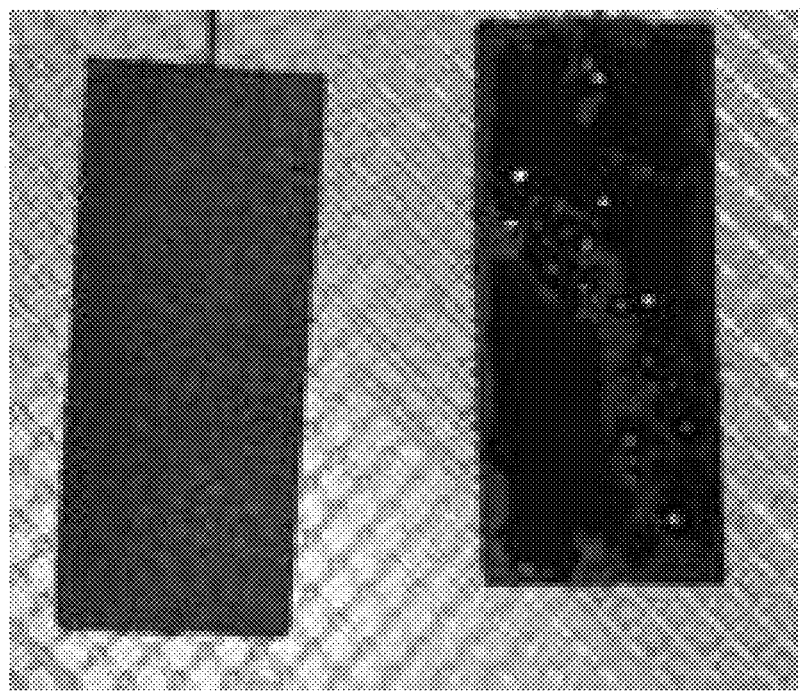

In contrast to similar anodes used in the past that includes table salt as a readily soluble ionic salt, the present invention uses non-hygroscopic ionic salts such as one of the salts listed above:

FIG. 3 shows a cathode with a non-hygroscopic salt on the left. In the figure, the non-hygroscopic salt being magnesium formate dihydrate. A control cathode with 10% by weight of NaCl is shown on right.

After the humidity test, cathodes made with non-hygroscopic salts did not have condensed water droplets on their surface. However, the control cathodes made with table salt, had water droplets condensed on their surface. Further testing has shown that that such droplets also form in humid environments over time, and that they bridge between the cathode and anode thereby draining the battery.

It is believed that batteries including only non-hygroscopic ionic salts have indefinite storage time in real conditions of temperature/relative humidity such as those found in places such as Jamaica, Florida, Hong Kong and the like.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A cathode material for an activated, deferred-action battery, said cathode material comprising on a skeletal frame, a readily soluble non-hygroscopic ionic salt, and at least one basic copper salt comprising at least one of basic copper sulfate and basic copper carbonate.

2. The cathode material of claim 1 wherein the readily soluble non-hygroscopic ionic salt is selected from the group comprising Copper(II) formate monohydrate [$Cu(HCO_2)_2 \cdot H_2O$], Sodium ferrocyanide decahydrate [$Na_4Fe(CN)_6 \cdot 10H_2O$], Potassium ferricyanide [$K_3Fe(CN)_6$], Potassium sulfate [$K_2SO_4$], Calcium lactate pentahydrate [$[CH_3CH(OH)COO]_2Ca \cdot 5H_2O$], Sodium citrate monobasic [$HOC(COONa)(COONa)(CH_2COOH)_2$] and Magnesium formate dihydrate [$C_2H_2MgO_4 \cdot 2H_2O$].

3. The cathode material of claim 1 further comprising a kaolin.

4. The cathode material of claim 1 further comprising an electronically conductive material that is optionally selected from the group comprising graphite, carbon black and carbon fibers.

5. The cathode material of claim 1 further comprising a binder material.

6. The cathode material of claim 5, wherein the binder material comprises a polymer, a wax or sulfur.

7. A Water Activated Battery characterized by A housing containing;
 a) at least one anode selected from the group consisting of magnesium, aluminum, zinc and alloys thereof;
 b) at least one cathode comprising a readily soluble non-hygroscopic ionic salt and at least one basic copper salt selected from the group of basic copper sulfate and basic copper carbonate;
 c) at least one cavity separating said cathode and said at least one anode; and
 d) at least one aperture through said housing leading to said at least one cavity for the ingress of an electrolyte-forming, aqueous liquid.

8. The water-activated, deferred-action battery of claim 7, wherein the basic copper salt of the cathode is compacted and fused to itself and to a skeletal frame to form a heat-fused, conductive, electrochemically active material.

9. The water-activated, deferred-action battery of claim 7, wherein a portion of a surface of the cathode is formed as open spaces.

10. The water-activated, deferred-action battery of claim 7 wherein the cathode material further comprises an electronically conductive material optionally selected from the group comprising graphite, carbon black and carbon fibers.

11. The water-activated, deferred-action battery of claim 7, wherein the cathode material further comprises a kaolin.

12. The water-activated, deferred-action battery according to claim 7 wherein the cathode further comprises a binder material optionally comprising a polymer, a wax or sulfur.

13. The water-activated, deferred-action battery according to claim 7 wherein the cathode material is fused to itself by heating during or after compression.

14. The water-activated, deferred-action battery according to claim 7, where the anode and cathode are configured as parallel flat plates.

15. The water-activated, deferred-action battery according to claim 7, where the anode is configured as a hollow cylinder and the cathode is configured as a smaller cylinder nested within the anode without contact between the anode and cathode.

16. The water-activated, deferred-action battery according to claim 7, where the cathode is configured as a hollow cylinder and the anode is configured as a smaller cylinder nested within the cathode without contact between the anode and cathode.

17. A method of fabricating a cathode from comprising a readily soluble non-hygroscopic ionic salt and at least one basic copper salt selected from the group of basic copper sulfate and basic copper carbonate on a skeletal frame, comprising fusing the cathode material to itself by heating during or after compression.

* * * * *